Patented Mar. 24, 1942

2,277,504

UNITED STATES PATENT OFFICE 2,277,504

PURIFICATION OF VINYLIDENE CHLORIDE POLYMERS

Ralph M. Wiley, Midland, Mich., assignor to The Dow Chemical Company, Midland, Mich., a corporation of Michigan No Drawing. Application January 14, 1939, Serial No. 250,932

8 Claims. (Cl. 260—80)

This invention relates to a process for the purification of resinous or polymeric materials prepared by the catalytic polymerization of vinylidene halides or vinyl halides, either alone or admixed with materials co-polymerizable therewith.

In the preparation of polymers and co-polymers derived from vinylidene halides and/or vinyl halides, it has been the practice to increase the rate of reaction by adding to the monomeric materials one or a mixture of polymerization catalysts. Among the catalysts which have been so employed are benzoyl peroxide, chloroacetyl chloride, and mixtures thereof with tetraethyl lead, nickel carbonyl, iron carbonyl, etc., as claimed in my co-pending applications Serial Nos. 164,127 and 164,128, filed September 16, 1937, now U. S. Patents Numbers 2,160,934 and 2,160,935, respectively. After polymerization, the solid or semi-solid resinous or polymeric composition contains traces of the catalytic materials intimately bound therein. When such polymers are freed in the usual way from the remaining unpolymerized material and are subjected to the elevated temperatures required in molding operations and the like, it is observed that the resinous product usually undergoes a decided color change, apparently as the result of a partial thermal decomposition, much of which has been found to be due to the presence in the mixture of traces of catalyst residue or of traces of low molecular weight polymer.

It is accordingly among the objects of the present invention to provide a method whereby catalyst residues and other readily decomposable materials may be completely removed from resinous and polymeric or co-polymeric products derived from vinylidene halides or from vinyl halides. Another object is to provide a process whereby there is obtained a polymeric or co-polymeric vinylidene halide or vinyl halide product which can be heated to a molding temperature without decomposition and discoloration.

It has now been found that the foregoing objects can be accomplished by treating the resinous or polymeric products derived from vinylidene halides e. g. vinylidene chloride, bromide, or chlorobromide, or products derived from polymeric vinyl halides, with a mineral acid to extract metal compounds, and a volatile water-miscible wetting agent, such as a lower aliphatic alcohol or a water-soluble lower ketone, to remove any low molecular weight polymer and to dry the purified polymer and free it from aqueous acid. The treatment may be performed stepwise, employing alternately a mineral acid and then an alcohol or ketone. I prefer, however, to treat the polymer or co-polymer with an alcoholic or ketonic solution of an aqueous mineral acid at a temperature between room temperature and the refluxing temperature of the acid-solvent mixture.

In a preferred embodiment of the invention, when an organic solvent solution of an aqueous mineral acid is employed, this mixture should comprise between about 75 and about 90 parts by volume of an alcohol or ketone and between about 10 and about 25 parts by volume of a 1 to 20 per cent by weight dilute aqueous mineral acid. Examples of the acids which may be employed are hydrochloric, nitric, and sulphuric acids, or mixtures thereof. Examples of volatile wetting agents, which serve as solvents for the aqueous acid and for the traces of low molecular weight polymer, are acetone, methyl ethyl ketone, and similar ketones, or methanol, ethanol, isopropanol, and similar alcohols. Mixtures of alcohols and ketones may, of course, be used.

In carrying out the purification, aqueous mineral acids cannot be used alone, as they do not effectively remove all possible sources of instability from the polymer.

The following examples illustrate the practice of the invention:

*Example 1*

A powdery dry, chalk-like polymer of vinylidene chloride, which had been polymerized using tetraethyl lead and benzoyl peroxide as catalyst, was covered with a liquid consisting of 80 parts by volume of acetone and 20 parts by volume of 1 per cent aqueous hydrochloric acid solution. The liquid was heated to its refluxing temperature for about 15 minutes. The vinylidene chloride resin was separated from the acetone-acid mixture by decantation, rinsed with a small amount of acetone to remove any aqueous acid remaining thereon, and dried. When heated to its softening point the washed resinous material remained substantially colorless. A sample of the unwashed resin heated to the same temperature turned quite dark and had a strongly acid odor.

*Example 2*

A resinous material, which had been prepared by the co-polymerization of vinylidene chloride and vinyl acetate in the presence of a mixture of tetraethyl lead, chloroacetyl chloride, and benzoyl peroxide as catalysts, was heated with a 0.5 per cent solution of hydrogen chloride in 75 per cent ethanol at the refluxing temperature of the acid-ethanol mixture for from 10 to 15 minutes. The resinous material was separated from the solvent in the manner described in Example 1 and was found to remain substantially colorless when heated to its softening point for a period of one hour. An untreated sample of the same co-polymer discolored badly at its softening point after a very few minutes.

*Example 3*

An acetone-insoluble co-polymer of about 75 per cent vinylidene chloride and 25 per cent vinyl chloride, the preparation of which had been catalyzed using the mixture of catalysts described in Example 2, was pulverized. The co-polymer had a strong odor, was corrosive to iron, and, when heated to the molding temperature (140° C.), turned dark brown, showing evidence of decomposition. 100 grams of the co-polymer was heated to 70° C. with about 300 cc. of 10 per cent aqueous nitric acid. The acid was removed by filtration, and the co-polymer was extracted with 300 cc. of acetone under reflux for 15 minutes. The co-polymer was then washed with cold, acid-free acetone, and dried. The product was colorless, odorless, non-corrosive, and resistant to thermal decomposition. It could be molded at 160° C. to form opaque, white, tough products.

*Example 4*

A co-polymer similar to that described in Example 3 was bleached with hot concentrated nitric acid, washed with water, and extracted with warm acetone. An excellent molding resin was produced. Similar results are obtained when the catalyst is extracted and the polymer bleached with aqua regia prior to the alcohol or acetone extraction.

The examples have illustrated the use of nitric acid followed by acetone, aqua regia followed by solvent, acetone-hydrochloric acid and alcohol-hydrochloric acid treatments to purify polymeric vinylidene chloride, its co-polymer with vinyl acetate, and its co-polymer with vinyl chloride. The methods described are similarly applicable to the purification of other polymerized and co-polymerized vinylidene halides and vinyl halides, provided that the said co-polymers are in the range of compositions which are substantially insoluble in the acid aqueous alcohol or acid aqueous ketone mixtures employed as extraction agents. Examples of vinylidene chloride co-polymers to which the method may be applied are those described in my co-pending applications Serial No. 123,479, filed February 1, 1937 now U. S. Patent No. 2,160,932; Serial No. 217,219, filed July 2, 1938 now U. S. Patent No. 2,160,945; and Serial No. 88,403, filed July 1, 1936 now U. S. Patent No. 2,160,931, wherein are claimed co-polymers of vinylidene chloride and styrene, alkyl acrylates, vinyl esters, etc.

This application is a continuation-in-part of my co-pending application Serial No. 88,403, filed July 1, 1936 now U. S. Patent No. 2,160,931.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:

1. The method of removing peroxide- and metal compound-containing catalyst residues and low molecular weight polymers from a polymeric material selected from the class consisting of polymeric vinyl halides, polymeric vinylidene halides, co-polymers of vinyl halides which are insoluble in and recoverable from acid aqueous lower aliphatic alcohols and acid aqueous lower aliphatic ketones, and co-polymers of vinylidene halides which are insoluble in and recoverable from acid aqueous lower aliphatic alcohols and acid aqueous lower aliphatic ketones, which comprises washing the finely divided and insoluble polymeric material with an aqueous mineral acid to remove metal compounds, and with a volatile water-soluble organic solvent selected from the group consisting of the water-soluble lower aliphatic alcohols and water-soluble lower aliphatic ketones, to serve as a wetting agent for the polymer and to extract therefrom thermo-instable compounds including low molecular weight polymers, thereby to produce a purified form of the polymer in a state of improved thermostability.

2. The method of removing peroxide- and metal compound-containing residues and low molecular weight polymers from a polymeric material selected from the class consisting of polymeric vinyl halides, polymeric vinylidene halides, co-polymers of vinyl halides which are insoluble in and recoverable from acid aqueous lower aliphatic alcohols and acid aqueous lower aliphatic ketones, and co-polymers of vinylidene halides which are insoluble in and recoverable from acid aqueous lower aliphatic alcohols and acid aqueous lower aliphatic ketones, which comprises washing the finely divided and insoluble polymeric material alternately with an aqueous mineral acid to remove metal compounds, and with a volatile water-soluble organic solvent selected from the group consisting of the water-soluble lower aliphatic alcohols and water-soluble lower aliphatic ketones, to serve as a wetting agent for the polymer and to extract therefrom thermo-instable compounds including low molecular weight polymers, thereby to produce a purified form of the polymer in a state of improved thermostability.

3. The method of removing peroxide- and metal compound-containing catalyst residues and low molecular weight polymers from a polymeric material selected from the class consisting of polymeric vinyl halides, polymeric vinylidene halides, co-polymers of vinyl halides which are insoluble in and recoverable from acid aqueous lower aliphatic alcohols and acid aqueous lower aliphatic ketones, and co-polymers of vinylidene halides which are insoluble in and recoverable from acid aqueous lower aliphatic alcohols and acid aqueous lower aliphatic ketones, which comprises subjecting the finely divided and insoluble polymeric material to extraction with a solution comprising an aqueous mineral acid dissolved in a water-soluble volatile organic solvent selected from the group consisting of the water-soluble lower aliphatic alcohols and water-soluble lower aliphatic ketones, at a temperature between room temperature and the refluxing temperature of the said solution, and separating the solution from the so-purified polymer.

4. The method of removing peroxide- and metal compound-containing catalyst residues and low molecular weight polymers from a polymeric material selected from the class consisting of polymeric vinyl halides, polymeric vinylidene halides, co-polymers of vinyl halides which are insoluble in and recoverable from acid aqueous lower aliphatic alcohols and acid aqueous lower aliphatic ketones, and co-polymers of vinylidene halides which are insoluble in and recoverable from acid aqueous lower aliphatic alcohols and acid aqueous lower aliphatic ketones, which comprises heating the finely divided and insoluble polymeric material with a solution comprising an aqueous mineral acid dissolved in a water-soluble volatile organic solvent selected from the group consisting of the water-soluble lower aliphatic alcohols and water-soluble lower aliphatic ketones, at the refluxing temperature of the said solution, and separating the solution from the so-purified polymer.

5. A method of removing peroxide- and metal compound-containing catalyst residues and low molecular weight polymer from polymeric vinylidene chloride, which comprises heating the finely divided polymer with a solution comprising an aqueous mineral acid dissolved in a water-soluble volatile organic solvent selected from the group consisting of the water-soluble lower aliphatic alcohols and water-soluble lower aliphatic ketones, at the refluxing temperature of the said solution, and separating the solution from the so-purified polymer.

6. A method of removing peroxide- and metal compound-containing catalyst residues and low molecular weight polymer from polymeric vinylidene chloride, which comprises heating the finely divided polymer with a solution containing between about 75 and about 90 parts by volume of a water-soluble volatile organic solvent selected from the group consisting of the water-soluble lower aliphatic alcohols and water-soluble lower ketones, and between about 10 and about 25 parts by volume of a 1 to 20 per cent by weight aqueous solution of a mineral acid, at the refluxing temperature of the solution, and separating the solution from the purified polymer.

7. The method as claimed in claim 1 wherein the volatile water-soluble organic solvent is acetone.

8. The method as claimed in claim 1 wherein the volatile water-soluble organic solvent is ethyl alcohol.

RALPH M. WILEY.